(12) United States Patent
Ouellette

(10) Patent No.: US 6,889,987 B2
(45) Date of Patent: May 10, 2005

(54) SNOWMOBILE SUPPORT STAND

(76) Inventor: Michael J Ouellette, P.O. Box 34, Caribou, ME (US) 04736

( * ) Notice: Subject to any disclaimer, the term of this patent is extended or adjusted under 35 U.S.C. 154(b) by 49 days.

(21) Appl. No.: 10/300,558

(22) Filed: Nov. 20, 2002

(65) Prior Publication Data

US 2004/0000778 A1 Jan. 1, 2004

Related U.S. Application Data

(63) Continuation-in-part of application No. 10/186,792, filed on Jul. 1, 2002, now abandoned.

(51) Int. Cl.[7] .............................................. B62B 13/18
(52) U.S. Cl. ........................... 280/9; 280/7.12; 280/767
(58) Field of Search ................................ 280/9, 11, 10, 280/8, 7.12, 7.14, 43.14, 43.23, 43.24, 763.1, 764.1, 767

(56) References Cited

U.S. PATENT DOCUMENTS

| 2,683,268 | A | * | 7/1954 | Strayer | 114/344 |
|---|---|---|---|---|---|
| 3,477,734 | A | * | 11/1969 | Albertson | 280/11 |
| 3,570,616 | A | * | 3/1971 | Tominaga | 180/185 |
| 3,777,829 | A | * | 12/1973 | Rogers | 180/184 |
| 3,810,662 | A | * | 5/1974 | Commanda | 280/415.1 |
| 4,082,155 | A | * | 4/1978 | McCartney | 180/185 |
| 4,274,656 | A | * | 6/1981 | Warren | 280/757 |
| 4,288,087 | A | * | 9/1981 | Morrison | 280/47.32 |
| 4,393,953 | A | * | 7/1983 | Boulianne | 180/190 |
| 5,421,611 | A | * | 6/1995 | Peterson et al. | 280/763.1 |
| 5,439,237 | A | * | 8/1995 | Kutchie | 280/11 |
| 6,102,438 | A | * | 8/2000 | Few et al. | 280/763.1 |
| 6,527,282 | B2 | * | 3/2003 | Ouellette | 280/7.14 |

* cited by examiner

Primary Examiner—Christopher P. Ellis
Assistant Examiner—Christopher Bottorff
(74) Attorney, Agent, or Firm—Patricia M. Mathers; Thomas L. Bohan

(57) ABSTRACT

A support stand for supporting the rear-end of a snowmobile above the ground. The apparatus may be fitted with rollers or wheels in order to improve the maneuverability of the snowmobile when it is being transported across a non-snow or non-ice surface.

17 Claims, 7 Drawing Sheets

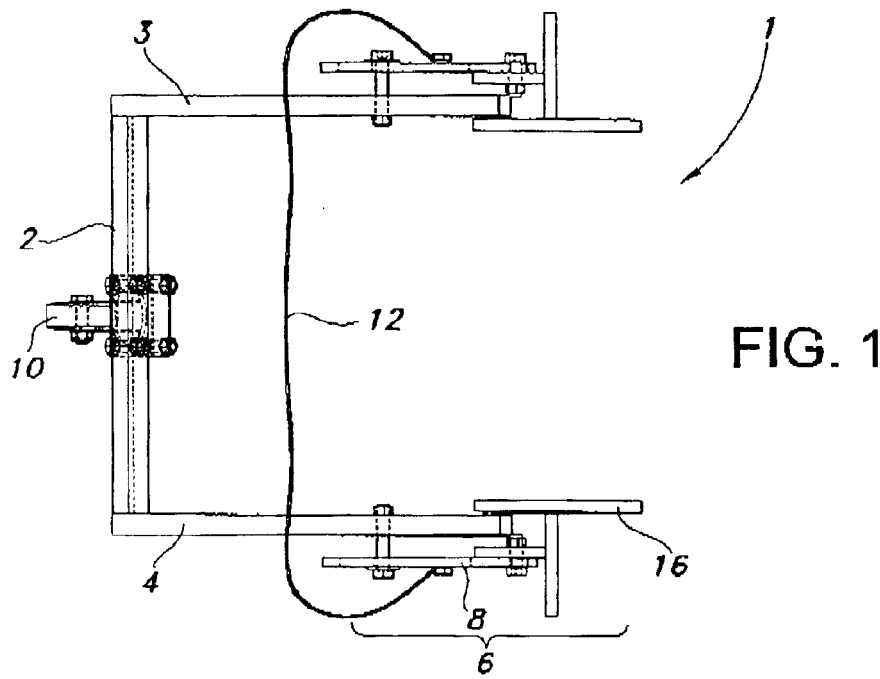
FIG. 1
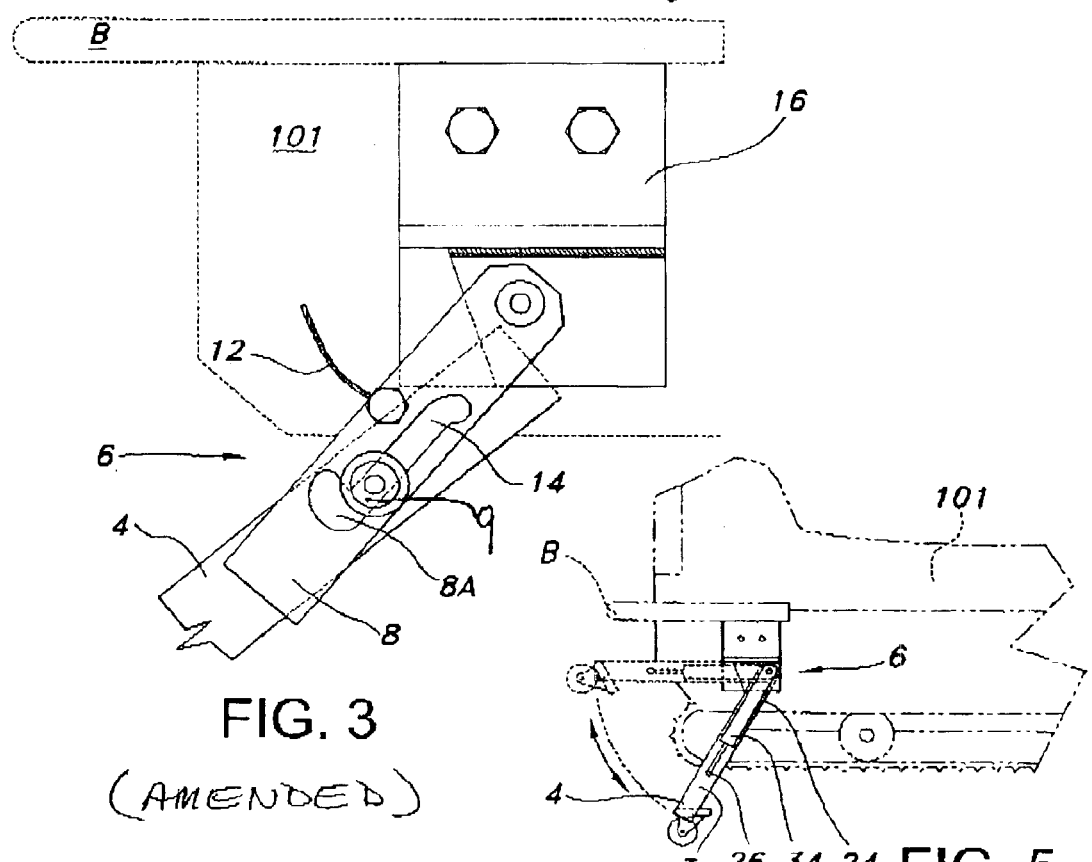
FIG. 3
(AMENDED)
FIG. 5

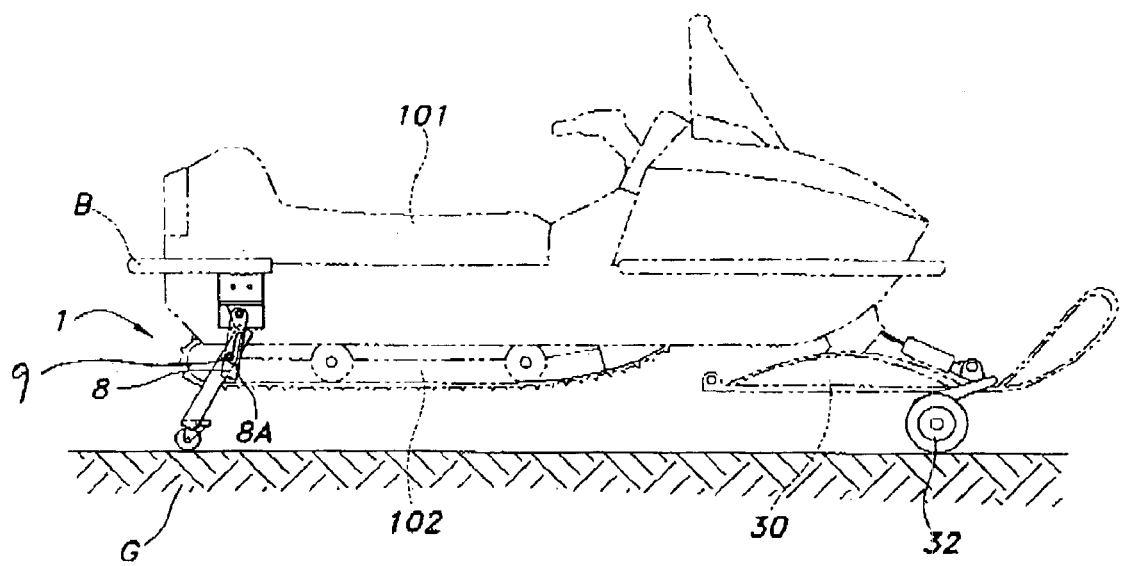
FIG. 4
(AMENDED)

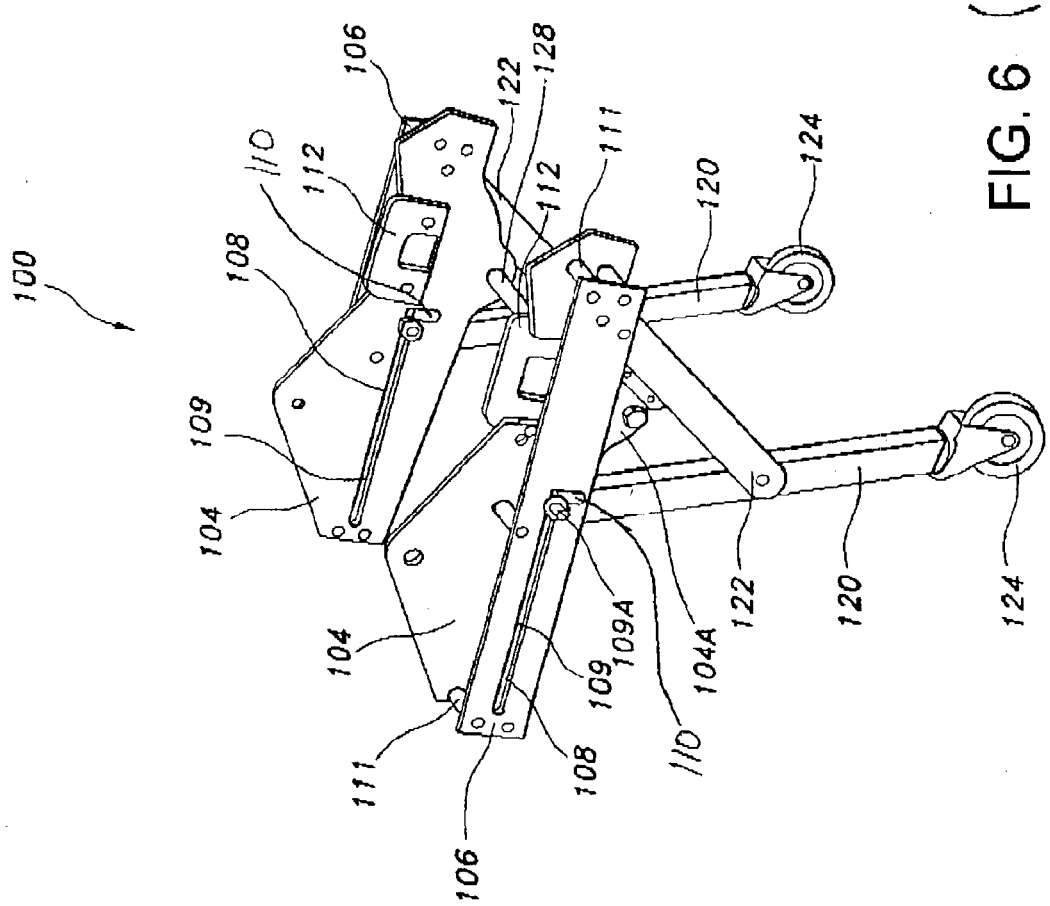
FIG. 6 (AMENDED)

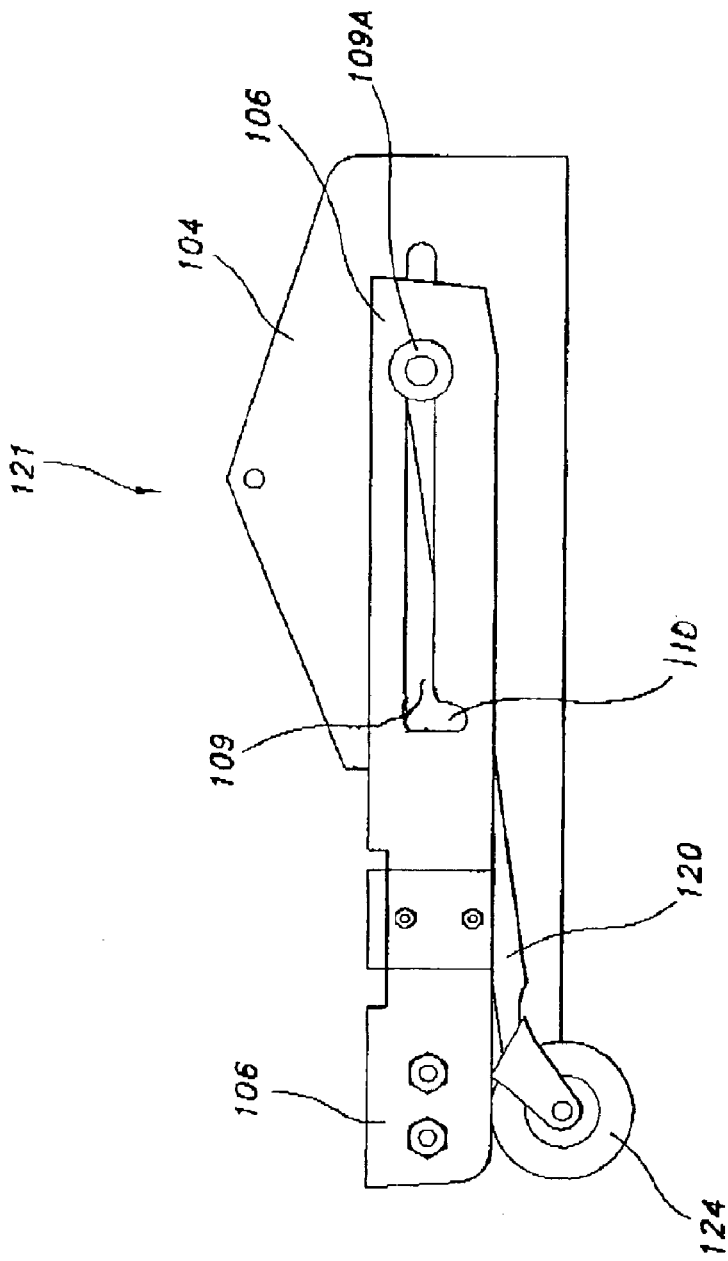
FIG. 9 (AMENDED)

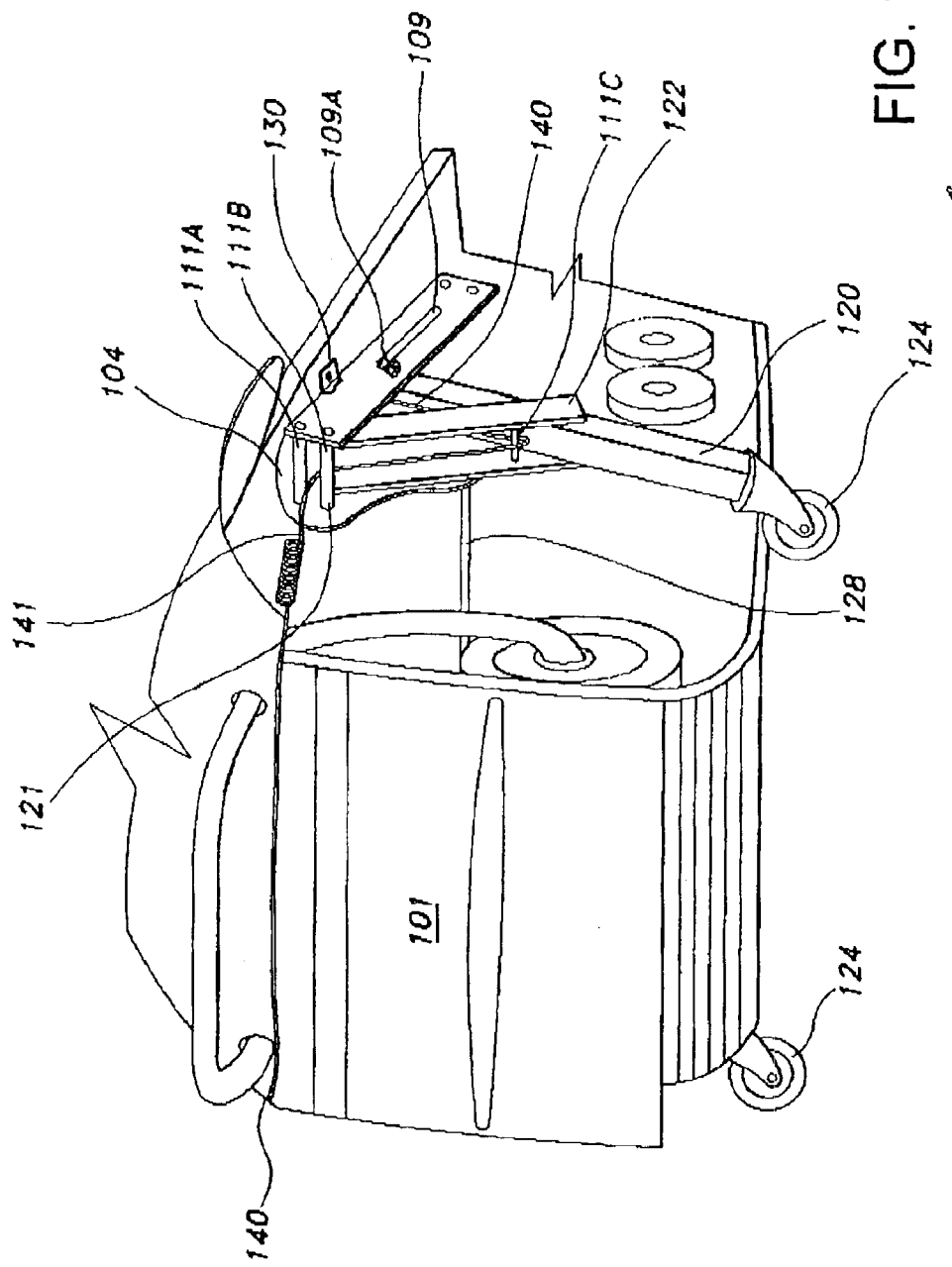
FIG. 10 (AMENDED)

SNOWMOBILE SUPPORT STAND

BACKGROUND OF THE INVENTION

1. Field of the Invention

This invention relates to the field of snowmobiles.

2. Description of the Prior Art

Snowmobiles are vehicles that are constructed to travel across snow and ice. As is generally known, the snowmobile is driven by an endless drive track arranged at the rear end of the underside of the snowmobile. The front end of the snowmobile is supported by, and rides along, two skis, which glide across the surface of the snow or ice. Typically, the skis have carbide inserts that run along a portion of the bottom surface of the ski runner and aid in the steering of the snowmobile.

A disadvantage of snowmobiles is that, when taken out of the their designed snow environment, they become quite difficult to transport because the skis and track drive do not readily glide along the surface when traveling across gravel, hardtop, or other non-snow surfaces. Therefore, even the most trivial of movements, such as, moving from one side of the garage to the other, requires a tremendous amount of effort and strength, because the snowmobile must repeatedly be lifted and dragged to its desired location. Often the owner resorts to alternating lifting and dragging the front of the snowmobile a few inches, then switches to lifting and dragging the back end to catch up with the front. It is easy to see understand that moving a snowmobile is difficult for riders who are not physically very strong, and is, at best, rather strenuous for even those riders who have a great deal of physical strength.

Such challenges are not limited to moving a snowmobile around a driveway or garage. Loading and unloading the snowmobile onto a flat-bed or a trailer, a common task for most snowmobile riders, presents another physically challenging task, even for the strongest of riders. Although the track drive can provide some of the moving power, the snowmobile is not at all steerable on non-snow surfaces and still needs to be guided by the operators to ensure that it travels in the desired direction. Normally two riders team up to guide and/or push the snowmobile in the desired direction—one rider mounts the snowmobile and operates the throttle, and the other pushes and guides the snowmobile. This cooperative effort is potentially extremely hazardous to the person guiding the snowmobile, as an unexpected fluctuation in the throttle can cause the snowmobile to lurch or jump, presenting the potential of severely injuring that person if he or she is in the path of the lurching snowmobile.

Not only is snowmobile movement on non-snow surfaces difficult, such movement is potentially damaging to the snowmobile as well. For example, driving or dragging a snowmobile across a non-snow surface subjects the track and the carbide tips on the skis to excessive wear and, as a result, they may require more frequent replacement.

Lack of accessibility to the lower portions of the machine, such as the drive track, can also present a difficulty to the rider. For example, to make adjustments to the drive track, the back end of the snowmobile must be propped up off the ground to allow free track movement. Typically, this is achieved in the shop by propping it up on cinder blocks, bricks, or resting it on a jack. This solution is inadequate for reasons of safety and convenience. For example, propping a snowmobile up on blocks is unsafe as it may fall over if jostled. Additionally, the rider who needs to make adjustments while out for a ride, generally does not have blocks or a jack available to support the snowmobile in a raised position.

What is needed, therefore, is apparatus for securing a snowmobile in an upright position, with the rear end of the snowmobile raised above the ground. What is further needed is such apparatus that is easily operable without requiring a great deal of physical strength. What is yet further needed is such apparatus that will allow the vehicle to be maneuvered easily over a surface that is not snow or ice. What is still yet further needed is such apparatus that will improve the steerability of a snowmobile while it is being maneuvered across a surface that is not snow or ice.

SUMMARY OF THE INVENTION

For the reasons cited above, it is an object of the present invention to provide apparatus that will secure a snowmobile in an upright position, with the rear end of the snowmobile raised above the ground. It is a further object to provide such apparatus that is easily operable by a single person, without requiring great physical strength. It is a yet further object to provide such apparatus that allows a single person to easily steer a snowmobile while maneuvering it across a surface that is not snow and/or ice.

The objects of the present invention have been achieved by providing a support stand, that is, a center stand or kick-stand, that is attached to the rear end of a snowmobile and is easily deployable. The support stand according to the invention is a collapsible support that is mounted on the rear end of the snowmobile and that, when deployed, provides a rigid support that lifts and supports the weight of the rear end of the snowmobile. The support stand may be equipped with a rolling means that allows the rear end of the snowmobile to roll along a floor or ground surface. The support stand also comprises a deployment mechanism for deploying and locking the stand into the deployed position, and, when stowed, for securing the stand in a stowed position.

In a first embodiment, a support stand comprises side arms that are attached to each side of the chassis of the snowmobile. The side arms are pivotable between a locked, deployed position and a stowed position. In the stowed position, the side arms are raised up off the ground and secured in place; in the deployed position, the side arms are dropped down and locked into a position that raises and supports the rear end of the snowmobile above the ground. If the support stand is equipped with a rolling means, deployment places the rolling means in contact with the ground surface, thereby allowing the rear end of the snowmobile to roll along the ground surface. In this first embodiment, a connecting bar or crossbar connects the lower ends of the side arms. The attachment and deployment mechanism comprises a pair of pivotable rails, one rail being attached to a respective side arm by means of a pin. The rail has a curved slot that includes a catch. When being deployed, the pin moves in the curved slot until it is caught in the catch. To secure the support stand in the stowed position, the crossbar is lifted up off the ground and secured in the stowed position by means of a cord or a latch mechanism.

In a second embodiment of the support stand according to the invention, the stand comprises two leg assemblies that are mounted at an upper end directly onto the chassis, one assembly on each side of the chassis. Each leg assembly includes a leg that is pivotable such that the lower end of the respective leg drops to the ground surface and is locked into a deployed position. The support stand may be equipped with a wheel, to provide a support stand that is rollable. The wheel is mounted at the lower end of the leg.

The attachment and deployment mechanism comprises a rail that is mounted on the chassis, along the side at the rear end of the snowmobile. The rail has a slot with a catch. The leg is linked to the rail by a pin that slides in the slot and that catches in the catch when the leg drops down into deployment position. Ideally, the leg assemblies are ganged together with a connecting bar at or near the upper end of the respective legs, so that the attachment and deployment means deploy both legs simultaneously.

The support stand according to the invention is retrofittable onto conventional snowmobiles. In such a case, the support stand assembly includes a mounting plate and/or brackets as required to attach the support stand to the chassis of the snowmobile. Also included within the scope of the invention is a support stand that is provided on a snowmobile as an integral part of the snowmobile construction. For example, the support stand may be provided as an option for a snowmobile that is equipped with a support stand mount for receiving the center stand assembly, or the support stand may be provided as a standard component of a snowmobile. In this case, the chassis of the snowmobile may include a well in which to stow the support stand when it is not deployed, and a mounting system and deployment means that is built into the walls of the well.

If the skis on the snowmobile are also equipped with wheels, the support stand with wheel now allows the snowmobile to glide easily and steerably across a non-snow, non-ice surface. Suitable ski wheels are disclosed in U.S. patent application Ser. No. 09/818,058, filed by the applicant of the present invention on Mar. 26, 2001, and which is incorporated herein by reference.

BRIEF DESCRIPTION OF THE DRAWINGS

FIG. 1 is a plan view of the first embodiment of the support stand according to the present invention.

FIG. 3 shows the mounting bracket and the deployment link of the present invention.

FIG. 4 is an elevational view of the snowmobile of FIG. 2, with the support stand and the ski wheels being in fully deployed position.

FIG. 5 is a partial view of the snowmobile of FIG. 2, equipped with the support stand according to the invention, the support stand having a fluid-pressure actuating means.

FIG. 6 is a perspective view of the second embodiment of the support stand according to the invention.

FIG. 9 is a planar view of the rail and mounting plate of FIG. 8, showing the side arm and wheel in the stowed position.

FIG. 10 is a perspective view of the rear end of a snowmobile with the support stand of FIG. 6 mounted onto the chassis and deployed.

DETAILED DESCRIPTION OF THE INVENTION

Figure 2:
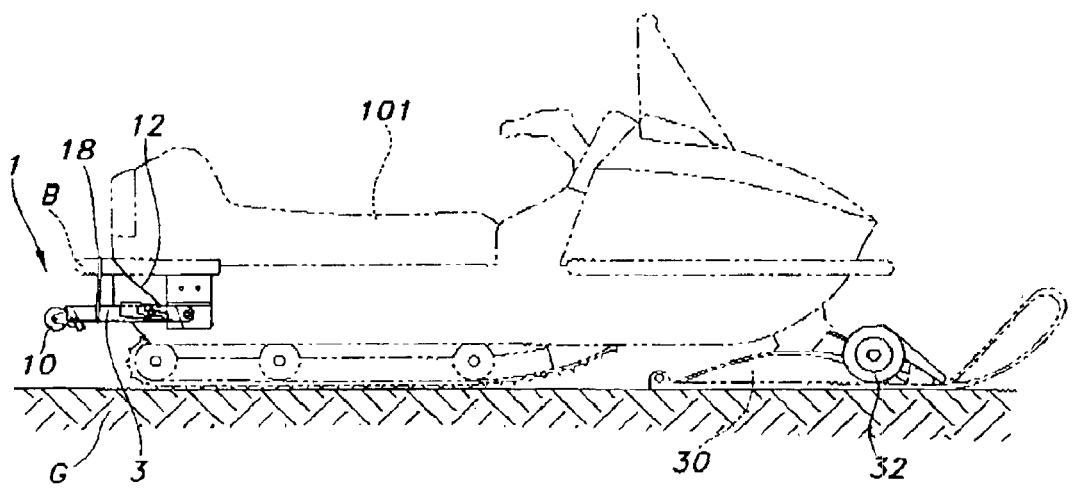
FIG. 2 is an elevational view of a snowmobile equipped with convertible skis with wheels and the support stand according to the present invention, the support stand and the wheels on the skis being in respective non-deployed positions.

FIG. 1 is an illustration of a first embodiment of a support stand 1 according to the present invention. The support stand 1 of this particular embodiment comprises a frame 3 and a rolling mechanism 10. Although in the description of this embodiment that follows, the rolling mechanism 10 is described, it should be understood that it is possible to provide the support stand 1 without a rolling mechanism. In that case, the support stand 1 becomes a stationary support stand that lifts the rear end of a snowmobile 101 above a ground surface G, but does not promote easy rollability of the snowmobile 101. The frame 3 in the embodiment shown includes a crossbar 2 and two side arms 4. At the distal end of each side arm 4 is an attachment and deployment means 6 by which the support stand 1 is pivotably attached to the body of a conventional snowmobile. Other embodiments of the frame 3 may be U-shaped or otherwise contoured so that the frame 3 is connectable to the body of a snowmobile in a way that does not hinder or interfere with the conventional operations of the snowmobile. In the particular embodiment shown in FIG. 1, the attachment and deployment means 6 includes a mounting bracket 16 and a deployment link 8 that is pivotably attached to the respective mounting bracket 16 at one end and to the side arm 4 at the other end. The rolling mechanism 10 is mounted on the crossbar 2. In the embodiment shown, the rolling mechanism 10 is a wheel. It is, of course, possible to mount more than one wheel on the crossbar 2 or to use some other suitable type of rolling mechanism 10 other than the wheel, such as a track with roller balls, or one or more rollers made of round stock that are assembled on the crossbar.

FIG. 2 shows the support stand 1 mounted on a conventional snowmobile 101 and secured in a stowed position by a retainer 18. The retainer 18 shown in this embodiment is a simple strap, but it should be understood that any suitable means for securing the support stand 1 can be used, such as a mechanical or electro-mechanical latch, a magnetic or electro-magnetic latch, a hasp and staple, etc. Also shown on the snowmobile 101 is a convertible ski 30 that has a ski-wheel 32 deployably attached to it. This convertible ski 30 is the subject of U.S. patent application Ser. No. 09/818,058, commonly owned by the inventor of the present invention. As shown in FIG. 2, the ski-wheel 32 is raised above the ground in a non-deployed position.

FIG. 3 illustrates the attachment and deployment mechanism 6 for securing the support stand 1 in a deployed position. The deployment link 8 is pivotably attached to the mounting bracket 16 and slidably attached to the side arm 4 by a pin 9. The deployment link 8 has a groove 14 that has a catch 8A that restrains the pin 9 from sliding in the groove 14, thereby securing the side arm 4 in the deployed position. FIG. 1 shows the support stand fully deployed, with the pin 9 restrained in the catch 8A; FIG. 3 shows the support stand before it is deployed, with the pin 9 able to slide in the groove 14. The mounting bracket 16 is securely affixed to each side of the conventional snowmobile 101 such that the support stand 1, when in the stowed position, is in the vicinity of a bumper B that is conventionally mounted on the snowmobile 101. A deployment cable 12 is connected to the deployment link 8 attached to the mounting bracket 16 on one side of the support stand 1 to the mounting bracket 16 on the other side of the support stand 1. For the sake of clarity, a mudflap that is typically attached to the snowmobile 101 beneath the bumper B is not shown.

To release the support stand 1 from the stowed position shown in FIG. 2 to a deployed position shown in FIG. 4, one pulls the retainer 18. In the embodiment shown in the FIGS. 2 and 4, the deployment link 8 pivots downward and the support stand 1 simply drops to the ground by force of gravity. By lifting slightly on the rear bumper of the snowmobile 101, the support stand 1 rolls under the snowmobile 101 and the pin 9 snaps into the catch 8A and holds the support stand 1 in the fully deployed position under the rear end of the snowmobile 101. FIG. 4 shows the snowmobile 101, equipped with the support stand 1 according to the present invention, and the convertible skis 30 with wheels 32. As shown, the rear end of the snowmobile is raised above ground level and supported on the rolling mechanism 10 when the support stand 1 is deployed. If the wheels 32 on the convertible skis 30 are deployed as well, the front end of the snowmobile 101 is also raised above ground level. In this position, the snowmobile 101 can be maneuvered easily across a surface that is neither snow nor ice. In addition, if the rolling mechanism 10 is a wheel that is swivel-mounted or roller balls that allow rotation in any direction, the snowmobile 101 can also be steered as it is pushed or pulled in a backward direction.

FIG. 5 illustrates another embodiment of the invention in which the deployment means 6 is a drive means 34 that drives the frame 3 into a deployed position as well as to a stowed position. The drive means 34 includes a cylinder 24 and a piston 26. As shown, the cylinder 24 is mounted on a side arm 4 of the frame and the operating end of the piston 26 is attached to the mounting block 16 so as to drive the frame 3 to a stowed position (shown with dotted lines) from a deployed position and vice versa. Fluid-pressure drive means such as the piston and cylinder drive means 34 shown in FIG. 5 are generally well-known and the details of such means and their means of actuation are neither discussed nor shown herein. It is within the scope of the invention, however, that such drive means 34 may be driven by any suitable pressurized fluid system, such as air or hydraulic fluid.

Figure 7:
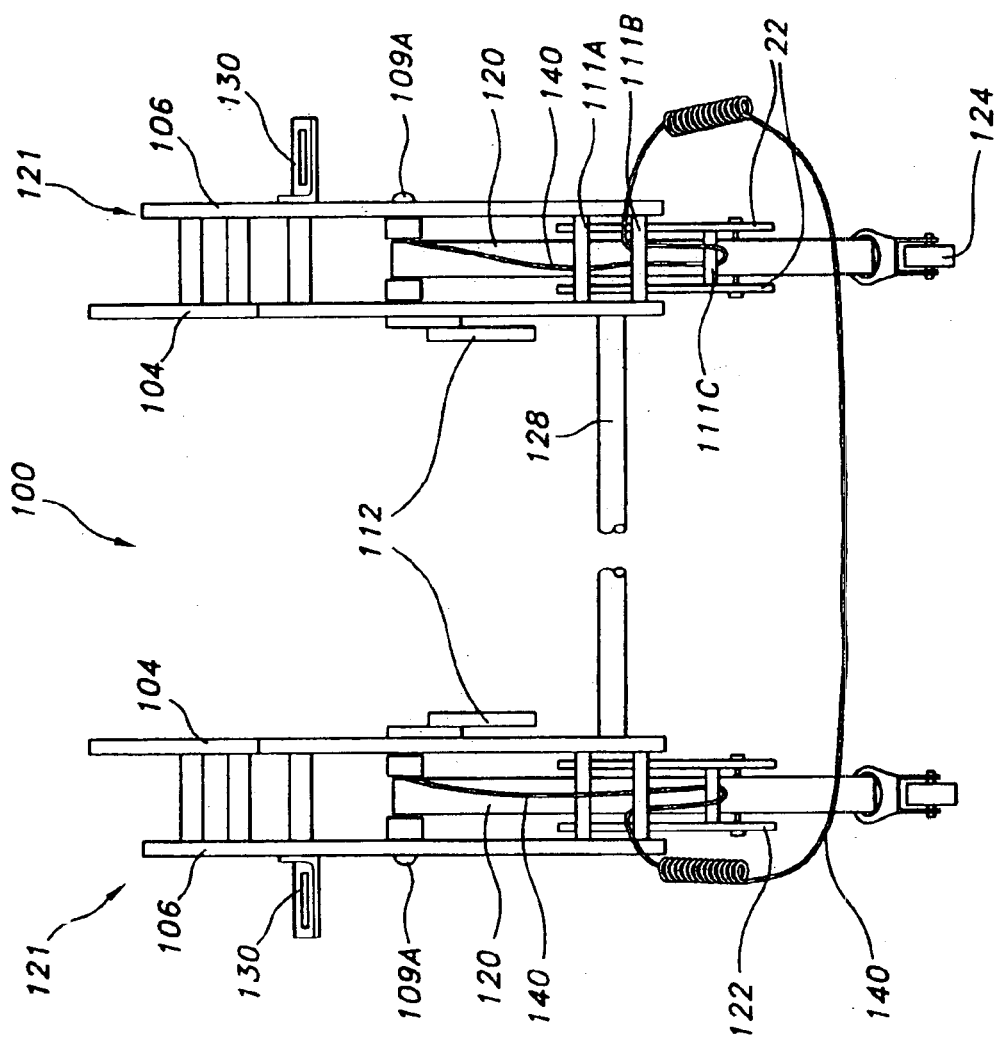
FIG. 7 is an elevational view of the support stand of FIG. 6, illustrating the assembly of the side arm with braces, the connecting bar, and the run of the deployment cable.

FIGS. 6–10 illustrate a second embodiment of the support stand 100 according to the invention. FIG. 6 is a perspective view and FIG. 7 a frontal (elevetional) view, showing the support stand 100 in its deployed position. As best shown in FIG. 7, the support stand 100 comprises two essentially identical leg assemblies 121, each of the assemblies ganged together by a ganging bar 128. In the embodiment shown, each leg assembly 121 comprises a support leg 120 with a wheel 124 mounted at the lower end and a deployment mechanism 108. The deployment mechanism 108 includes a means of allowing the leg assembly 121 to drop from a stowed position, illustrated in FIG. 9, to a deployment position, shown in FIG. 6. In this second embodiment, the deployment mechanism 108 comprises a pair of rails, 104 and 106, each rail having a groove 109 for slidably receiving a pin 109A. The pin 109A pivotably links the upper end of the leg 120 to the two rails, 104, 106. A catch or locking slot 110 is provided in one end of the groove 109 in which the pin 109A catches when the leg 120 is allowed to drop, and looks the leg 120 into a deployed position. In FIG 6, for purposes of illustration, the pin 109A is shown just before it drops down into the locking slot 110.

In this second embodiment, the support stand 100 is designed to be retrofitted onto a conventional snowmobile 101 and one of the rails, a first rail 104, serves a dual function. Not only does it serve as part of the deployment mechanism 108, but also as as a mounting bracket to mount the support stand 100 to the chassis of the snowmobile 101. As shown in FIG. 6, the first rail 104 has a contour that fits a conventional snowmobile. A portion 104A of the rail 104 extends downward sufficiently to provide a convenient location for mounting the ganging bar 128 without interfering with the operation of the snowmobile or the support stand. A plate 112 is provided on the first rail 104 to accommodate a bogey wheel on the snowmobile.

The legs 120 are braced with braces 122. In the embodiment shown, an upper end of a first brace 122 is pivotably attached to the first rail 104 and an upper end of a second brace 122 is attached to the second rail 106; the lower ends of the braces 122 are pivotably attached to the respective legs 120 as shown in FIGS. 6 and 7. The leg assembly 121 further comprises assembly spacer bars 111 which hold the first rail 104 and the second rail 106 a distance apart to accommodate the width of the leg 120 and bushings.

Figure 8:
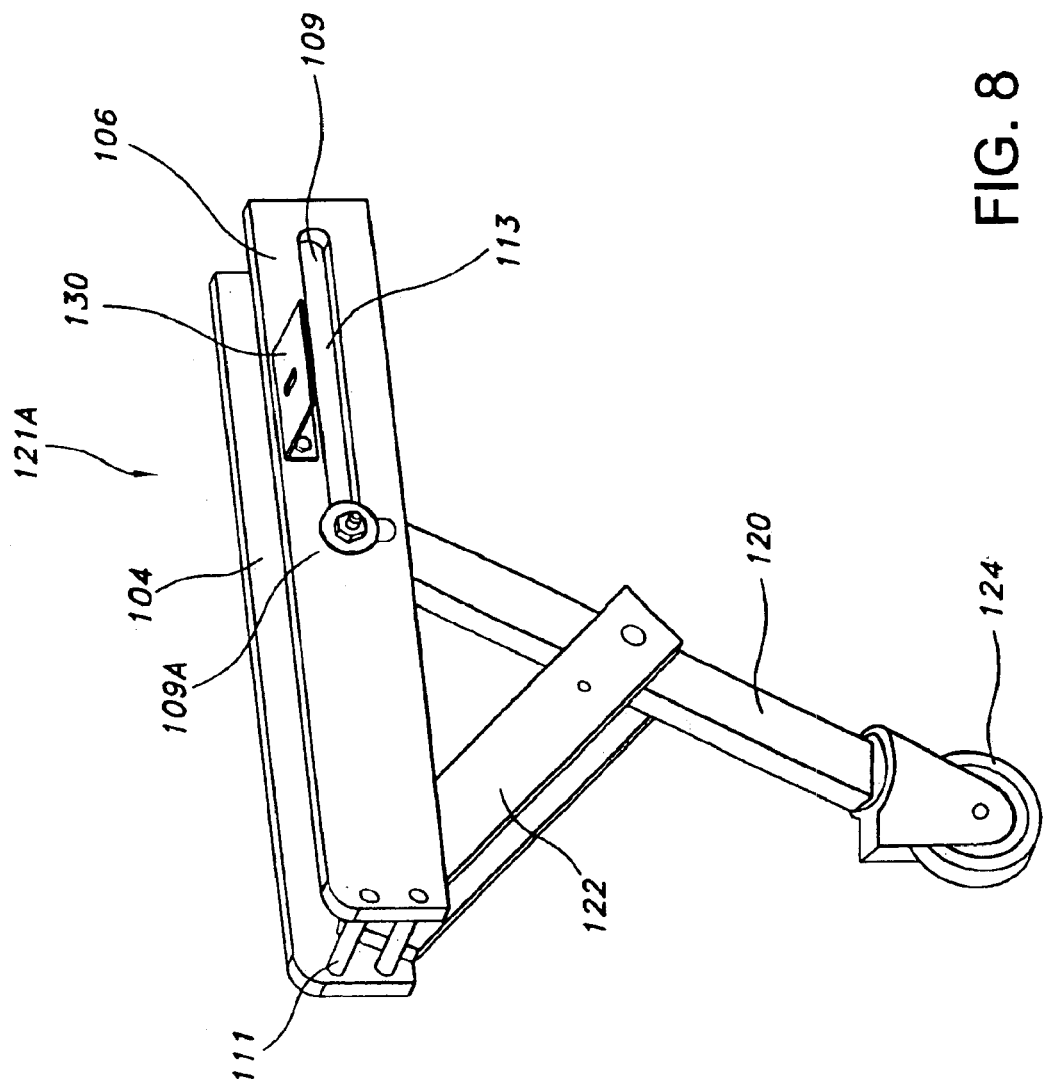
FIG. 8 is a perspective view of the rail and mounting plate of the support stand of FIG. 6, showing the side arm in deployed position.

FIG. 8 illustrates a leg assembly 121A that is used on a snowmobile having a chassis that is constructed to receive or hold the support stand 100 according to the invention. In this case, the first rail 104 is essentially identical to the second rail 106, and is mounted on a mount provided on the chassis.

FIG. 9 shows the leg assembly 121 with the leg 120 retracted in a stowed position. Also shown in this view is a bracket 130 that is used to provide an additional attaching point to the chassis of the snowmobile 101.

FIG. 10 is a perspective illustration of the second embodiment of the support stand 100 according to the invention, mounted on a conventional snowmobile 101. Only one side of the rear end of the snowmobile 101 is shown, and that with only sufficient detail to properly illustrate the mounting of the support stand 100 on the snowmobile 101. As shown, the leg assembly 121 is attached to the chassis of the snowmobile 101, one assembly on each side of the snowmobile 101. The ganging bar 128 connects the two leg assemblies 121 and is shown in this illustration extended from the one leg assembly 121 through the chassis of the snowmobile. The bracket 130, mentioned earlier, is attached to the bottom surface of a horizontally extending panel on the chassis. Whether this bracket 130 is necessary depends on the specific geometry of the conventional snowmobile and it should be understood it is within the scope of the present invention to use one or more brackets as required to fasten the support stand 100 to the conventional snowmobile.

The support stand 100 according to the invention also includes an actuation mechanism 140, which, in this case, is a spring-biased tension cord 141 that extends around the bumper of the conventional snowmobile and is attached to each leg 120 of the support stand 100. As shown in FIG. 10, the tension cord 141 feeds into the leg assembly 121 through assembly spacer bars 111A and 111b, runs down to a lower assembly spacer bar 111C, and then up to the upper end of the leg 120 where it is attached. By pulling on the tension cord 141, ideally while lifting the rear end of the snowmobile 101 at the same time, the pin 109A is moved from the locking slot 110 up into the guide groove 109, allowing the leg assembly to be folded to stowed position. Other actuating mechanisms as described above in conjunction with the first embodiment of the support stand 1 are also applicable to this second embodiment. Such actuating mechanisms include pressurized fluid systems, such as a pneumatically driven piston and cylinder unit. For example, with such an actuating mechanism, one end of the piston is connected to the leg 120 and the other captured in a cylinder that is mounted on the chassis of the snowmobile 101 or on a bracket or rail of the support stand 100.

The illustration of the second embodiment shows the support stand 100 having a wheel 124 at the lower end of each leg 120. It is within the scope of the invention to provide the support stand 100 without the wheels mounted on the legs. The support stand 100 is then a stationary support stand that raises the rear end of the snowmobile above the ground surface G.

The embodiments described herein are merely illustrative of the present invention. It should be understood that variations in construction of the present invention may be contemplated in view of the following claims, without straying from the intended scope and field of the invention herein disclosed.

What is claimed is:

1. Apparatus for supporting a rear end of a drive track of a snowmobile above a ground surface, said apparatus comprising:

a support stand mounted on said snowmobile, said support stand having two side arms;

a rolling means mounted on said support stand; and a deployment means linked with said two side arms for simultaneously releasing said two side arms from a deployed position, wherein said deployment means includes a deployment cable, a mounting bracket, and a link with a guide groove having a deployed-position catch, wherein said mounting bracket is fixedly mounted on said snowmobile and said link is pivotably connected at one end to said mounting bracket and slidably connected to said support stand by means of a fastener that has a first end that is attached to said support stand and a second end that is slidably captured in said guide groove, and wherein said fastener is restrainable in said deployed-position catch when said device is deployed and released from said deployed-position by a pull on said deployment cable.

2. The apparatus of claim 1, wherein said deployment means is a drive means that includes a cylinder and piston, wherein said cylinder is mounted on said snowmobile and an operating end of said piston is connected to said support stand so as to move said support stand from said stowed position to said deployment position and from said deployment position to said stowed position.

3. The apparatus of claim 1, wherein said support stand is a U-shaped frame with a crossbar between said side arms, and wherein said rolling means includes a wheel that is mounted on said crossbar.

4. The apparatus of claim 3, wherein said wheel is a swivel caster.

5. The apparatus of claim 1, wherein said rolling means comprises a roller mounted on a crossbar that extends between said side arms.

6. The apparatus of claim 1, wherein said rolling means comprises a wheel that is mounted on said lower end of at least one of said side arms.

7. The apparatus of claim 6, wherein said wheel is a swivel caster.

8. The apparatus of claim 1, further comprising a support stand restraining means far securing said support stand in a stowed position and for simultaneously releasing said side arms from said stowed position.

9. Apparatus for supporting a rear end of a drive track of a snowmobile above a ground surface, said snowmobile having two sides, a first side end a second side, said apparatus comprising:

a mounting assembly that includes a mounting rail, a first guide groove, and a pin, one end of which is slidably captured in said first guide groove;

a support leg with a rolling means attached thereto; and a deployment means;

wherein said mounting assembly includes a first mounting assembly that is mountable on said first side of said snowmobile and a second mounting assembly that is mountable on said second side, wherein said support leg includes a first support leg that is pivotably attached to said pin in said first mounting assembly and a second support leg analogously attached to said pin in said second mounting assembly; and wherein said deployment means simultaneously releases said first support leg and said second support leg from a deployed position in which said support stand supports said snowmobile above said ground surface, to a stowable position.

10. The apparatus of claim 9, wherein said deployment means includes a cable that is coupled to said pin such that, when said cable is pulled, said first support leg and said second support leg are from said deployed position.

11. The apparatus of claim 9, wherein said mounting assembly further includes a second rail having a second guide groove and wherein a second end of said pin is captured in said second guide groove, with said support leg pivotably suspended from said pin between said mounting rail and said second rail.

12. The apparatus of claim 11, wherein said first guide groove and said second guide groove have a locking slot that receives and restrains said pin in said groove and prevents said support stand from being released from said deployed position.

13. The apparatus of claim 9, wherein said deployment means includes a power-assisted means that moves said support leg from said stowable position to a stowed position and vice versa.

14. The apparatus of claim 13, wherein said power-assisted means is a fluid-pressurized unit including a piston attached at a first end to said support leg and captured at a second end in a pressurized cylinder that is mounted on said snowmobile.

15. The apparatus of claim 9, further comprising a connecting bar that extends between said first support leg and said second support leg.

16. The apparatus of claim 9, wherein said rolling mechanism is a wheel.

17. The apparatus of claim 10, further comprising a support stand restraining means for securing said support stand in a stowed position and for simultaneously releasing said first support leg and said second support leg from said stowed position.

* * * * *